May 27, 1952     J. F. FITZGERALD     2,597,982
FISH LURE

Filed June 11, 1949     2 SHEETS—SHEET 1

INVENTOR:
James F. Fitzgerald,
BY Louis Chayka
ATTORNEY.

May 27, 1952  J. F. FITZGERALD  2,597,982
FISH LURE
Filed June 11, 1949  2 SHEETS—SHEET 2

INVENTOR:
James F. Fitzgerald,
BY Louis Chayka
ATTORNEY.

Patented May 27, 1952

2,597,982

UNITED STATES PATENT OFFICE 2,597,982

FISH LURE

James F. Fitzgerald, Detroit, Mich.

Application June 11, 1949, Serial No. 98,615

9 Claims. (Cl. 43—42.12)

In general, and in accordance with my invention, I provide an inner body and an outer body both mounted for relative rotation on a common rotational axis, each body being of generally cylindrical contour throughout a major portion of its length and having its cylinder axis coaxial with said common rotational axis. Moreover, each body is of a construction to present to the observer a grating of closely spaced lines, or stripes, which are disposed generally circumferentially of the body. The stripes are uniformly or substantially uniformly spaced from each other lengthwise of the rotational axis to provide transparent spacing portions between adjacent stripes. Thus, the stripes of the inner body may be observed through the spacing portions between the stripes of the outer body. The spacing of the stripes of one body is somewhat different than the spacing of the stripes of the other and by relative rotation of the bodies on said axis the individual stripes or lines of one body may be caused to move past the individual lines or stripes of the other, to create an interference pattern appearing to flow generally axially of the respective bodies. Advantageously, and in accordance with one of the illustrative embodiments of my invention, each of said bodies is formed of transparent material upon which the grating is inscribed in the form of lines or stripes extending circumferentially of the body, one of said bodies being so constructed as to be caused to rotate on said common rotational axis as the lure is drawn through the water. The rotation causes the body to move axially longitudinally back and forth thereby to produce the desired interference pattern by the consequent relative axial movement of the respective gratings. In accordance with another of the illustrative embodiments of my invention, each of said bodies comprises a helically wound coil, whose individual helices form individual stripes as aforesaid. Both coils are mounted as aforesaid for relative rotation on the same axis as the lure is drawn through the water, the rotation giving rise to an apparent relative axial movement of the stripes and to the formation of the desired interference pattern.

I shall now describe my lure with reference to the accompanying drawings, in which.

Similar numerals refer to similar parts throughout the several views.

The lure shown in Figs. 1 to 5 includes a cylindrical body or float 10 made, preferably, of a suitable plastic and transparent material, the body terminating at each end with a substantially cone-shaped closure 11. A shaft 12, axially passing through said body, serves as its support, the ends of said body being advantageously in a water tight engagement with said shaft. To describe it in different words, it may be said that the shaft is imbedded in the substantially cone-shaped ends of said cylindrical body 10. The body, being hollow, renders the lure, as a whole, light and buoyant when the body is watertight, but it will be understood that since the lure in use is drawn through the water it will tend to rise under the dynamic lift derived from its forward movement regardless of whether the body 10 is or is not a float as such.

Figure 1:
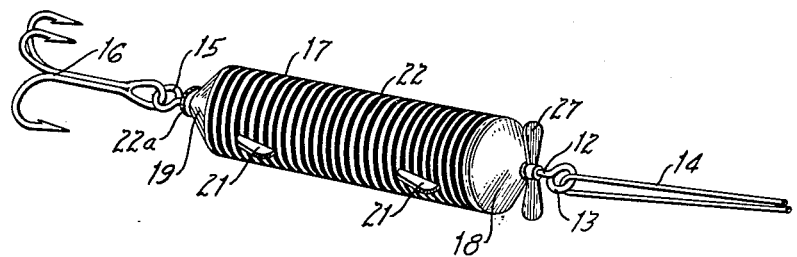
Fig. 1 is a perspective view of one embodiment of a lure in accordance with my invention.
Figure 2:
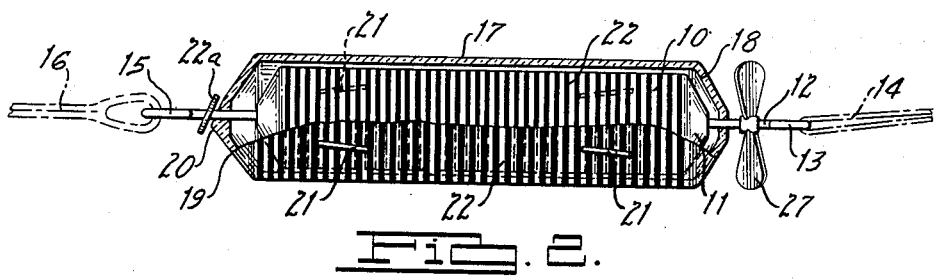
Fig. 2 is a longitudinal view in side elevation of the lure shown in Fig. 1 with a part of the outer body thereof broken away to show the inner body.
Figure 3:
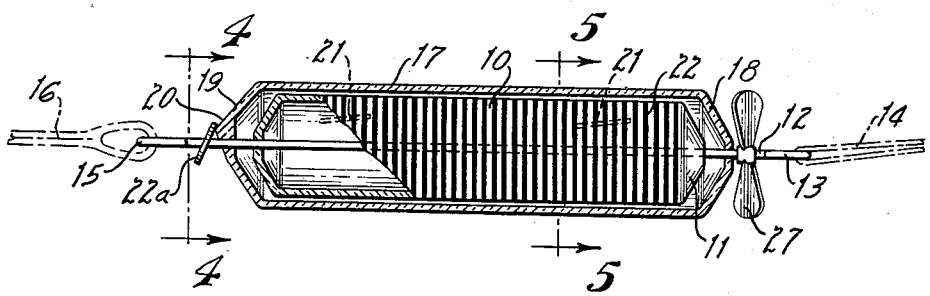
Fig. 3 is a partial longitudinal sectional view through the outer body of the lure shown in Fig. 1, with a part of the inner body broken away.
Figures 4, 5:
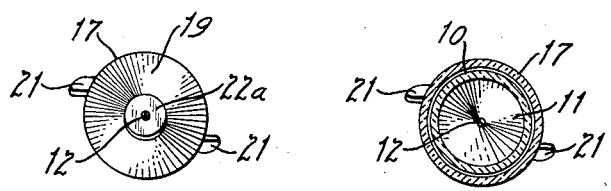
Fig. 4 is a view on line 4—4 of Fig. 3.
Fig. 5 is a view in section on line 5—5 of Fig. 3.
Figure 6:
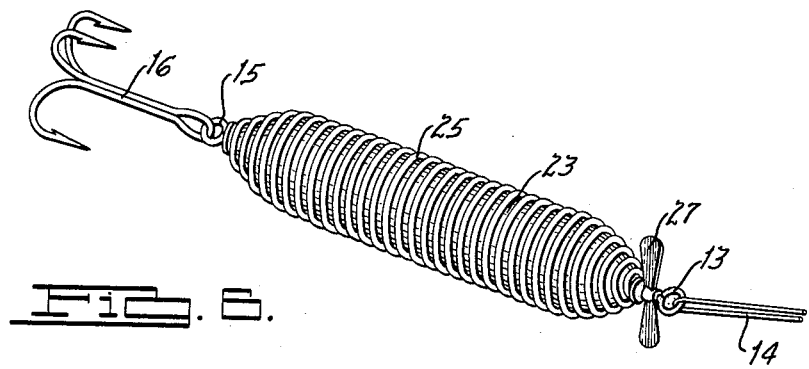
Fig. 6 is a perspective view of another embodiment of a lure in accordance with my invention.
Figure 7:
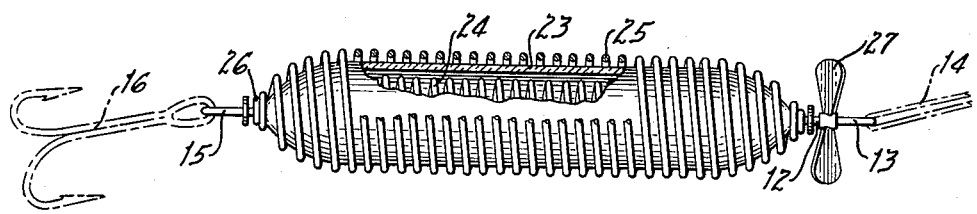
Fig. 7 is a side elevational view of the lure shown in Fig. 6, with a part of the outer body broken away.
Figure 8:
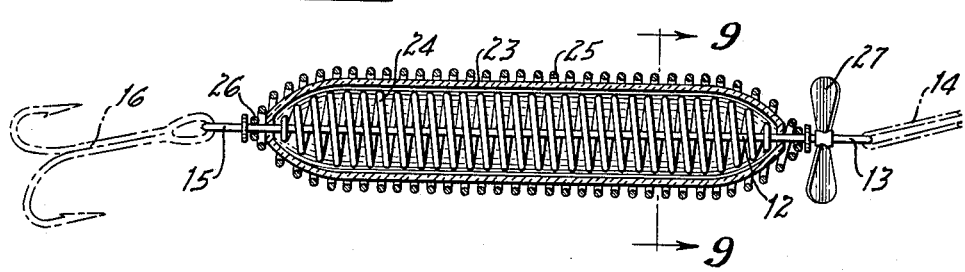
Fig. 8 is a longitudinal sectional view of the lure shown in Fig. 6 taken in the plane of the central longitudinal axis.
Figure 9:
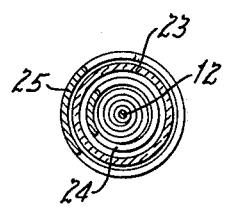
Fig. 9 is a sectional view taken along line 9—9 of Fig. 8.

At what is the front end of the lure, shaft 12 is bent to form an eye 13 for attachment to a fish line 14. At the opposite or rear end of the lure, the shaft is formed into another eye 15 for suspension of fish hooks 16. Mounted upon the same shaft, over the cylindrical body 10 which will now be described as the inner body, is an outer cylindrical body 17, terminating at the front in an integrally formed generally frustro-conical closure 18 and terminating at the rear end in a similar frustro-conical closure 19, except that the frustrum plane of the closure 19 is inclined to the axis of the shaft 12, as best shown in Figs. 2 and 3 thus providing a peak 20 which is radially offset from the shaft 12.

The wall of outer body 17 is transparent and spaced from float 10, and the whole body 17 is designed to rotate on said shaft 12. It will be apparent that the cylinder axes of the bodies 16 and 17 are coaxial with the rotational axis of shaft 12. As a means of imparting a rotary movement to said body 17, I have provided it with fins 21, these being set substantially radially with respect to the shaft, but each at a suitable angle thereto and to the direction of movement of the lure as a whole when pulled by a fish line so that the body 17 will be caused to rotate on the shaft 12 by the relative movement between the fins 21 and the water. As a means of preventing the inner body from rotating jointly with the outer cylindrical body 17, I have provided a spinner 27 on said shaft 12 rearwardly of eye 13, the setting of the spinner blades being such as to impart to the body 10 a rotational force counter to that imparted to it by the body 17.

Mounted on the shaft 12, at the rear end thereof, is a washer 22a fixedly disposed at an angle thereto and providing a cam surface for abutment with the peak portion 20 of closure 19. Both the outer body 17 and the inner body 10 have a plurality of closely spaced lines or stripes 22 inscribed upon them, each stripe running around the respective cylindrical body.

At this stage I wish to point out certain important features pertaining to said stripes, the word stripe indicating what may be simply called a thick line in the everyday acceptance of the meaning of the term. One of said features consists in having a different number of stripes, say per inch or other unit of length, on one cylindrical body than on the other. To illustrate, if the cylindrical body, say the inner body, has ten stripes per inch, the outer cylinder may have ten per cent more or less stripes, the figure ten per cent not being critical and may be varied. The relative number of stripes on the two cylinders is analogous to the number of lines along two adjoining strips calibrated for vernier measurements. Another important factor is that the spacing between the stripes on each cylinder is preferably equal to the thickness, that is, to the lateral dimensions, of the stripes. In such case, as the number of stripes per unit of length on one cylinder is different than the number of stripes on the other cylinder, this means that both the spacing between the stripes and the number of stripes on one cylinder will be slightly different than on the other cylinder.

The fish lure shown in Figs. 6 to 9 includes only one cylindrical body 23 made of a transparent material and mounted on shaft 12. The body is analogous to said inner cylindrical body 10 in the first-described species of my lure, and differs from it only in one respect: instead of being inscribed with transverse stripes, it contains a wire coiled helically about shaft 12 to form a helical coil 24. In this construction of the inner body the individual coils, when seen through the wall, are analogous to stripes in the first-described species.

The body 23 is hollow and preferably is sealed at both ends against inflow of water. Instead of employing another transparent cylindrical body, or outer shell, with lines inscribed thereon as in Figs. 1–5 inclusive, I employ another helical wire coil 25 concentric with said body 23, but in a spaced relation thereto, the diameter of the coil decreasing at both ends where the terminal portions of the wire are loosely looped about shaft 12, as shown at 26. The loose mounting of the wire permits free rotation of the coil 25 on shaft 12, the coil being set in rotation in an obvious manner by the pressure exerted on it as the lure is drawn through the water.

Now I shall describe the operation of my lure, with special reference to the first-described species. It will be understood that the lure is to be attached to a fish line. As it will be pulled through water, the pressure of water will urge the outer cylindrical body against the washer 22a. Simultaneously fins 21 will impart to the body a rotary movement on said shaft 12. As set out in the description of said body 17, it includes a cone-shaped rear end with an off center peak 20. In the course of the rotation of said body 17, the peak will be successively in abutment with the surface of the forwardly inclined washer and then with the rearwardly inclined surface of the washer, the effect being like that resulting from the operation of a cam acting upon the rear end of body 17. In other words, what will happen is that said body will be shifted longitudinally on shaft 12 back and forth in the course of its rotation on said shaft 12. This longitudinal movement of body 17 will cause the transverse lines 22, on said body, to move back and forth past the similar lines or stripes 22 on the inner body 10.

At certain phases of the longitudinal movement, certain stripes on one cylinder will be in register with the stripes on the other cylinder while the immediately adjoining stripes on one cylinder will be slightly off register with the adjoining stripes on the other cylinder. The stripes further removed from said stripes which are in register will be gradually more out of alinement. This is best shown in Fig. 2, wherein the stripes on the inner body 10 are shown in dotted lines where they may be seen through the wall of the outer body. It will be understood that said stripes of one body, say the outer cylinder, will be continually shifting along the stripes of the inner body. When the stripes of the two bodies will be aligned, the adjoining spacing will transmit light. Where the stripes of one body will be opposite the spacing of the stripes of the other body, the body will be obscured, said obscurity growing less opaque as the stripes approach alinement. The result will be that an interference pattern of flowing shadowy portions will appear on the body of the lure, the portions moving longitudinally along said body.

The operation of the species shown in Figs. 6 to 9 is analogous. Here the wire coils 24 and 25 are an equivalent of stripes, and here, too, it is important that the number of helices of the inner body, per unit of length, be slightly different than the number of coils, per the same unit, of the outer coil, and that the thickness of the wire be approximately equal to the spacing between the coils both of the float and of the outer body. As the outer coil will rotate, the effect of creating shadowy portions moving along the body will be carried out in a manner analogous to that described in the first-described species of my lure.

It will be obvious that some slight changes may be made in the construction of my lure. For instance, it would be possible to use a body striped on the outside as the inner element of my lure, with a coiled member on the outside, or visa versa, or the shell 23 may be omitted entirely from the embodiment of Fig. 8. Other possible changes may be made in the design of the lure, without departing from the inventive principle disclosed herein.

What I, therefore, wish to claim is as follows:

1. A fish lure including two hollow cylindrical bodies of transparent material, one body being within the other and both being mounted, one fixedly, and one rotatably on a shaft axially passing through both of said bodies, fins on the outer body to cause rotation thereof when the lure is pulled through water, spinner means to minimize rotation of the inner body in the opposite direction, cam means fixedly mounted on the shaft in cooperative engagement with a cam surface at one end of the outer body to cause a longitudinal shift forwardly of said outer body in the course of each rotation thereof about the shaft, both the outer and the inner bodies being circumscribed with a plurality of closely spaced stripes, means on the shaft for attachment to a fish line, and means for the attachment of fish hooks on the shaft.

2. A fish lure comprising a hollow cylindrical float of transparent material, a shaft axially passing through the float and having at one end an eye for attachment to a fish line and at the opposite end means for attachment of fish hooks thereto, said float being fixedly mounted on said shaft, a cylindrical outer body of transparent material mounted on the shaft for rotation about the hollow float, the rear end portion of the outer body being made in substantially the shape of a cone, the peak of which is off center, a plurality of fins on the outer surface of the outer body, the fins being set at an angle to the longitudinal axis of the shaft to cause rotation of the outer body when the lure is pulled through water, a washer fixedly mounted on said shaft and set axially on the shaft back of said outer body at an angle to the longitudinal axis of the shaft for engagement with said off center peak to cause a longitudinal movement of the outer body upon the shaft, and a spinner axially affixed to the shaft to minimize rotation of the float in the direction opposite to that of the rotation of the outer body, both the float and the outer body being circumscribed with a plurality of closely spaced stripes.

3. A fish lure comprising a shaft, a cylindrical float of transparent material fixedly mounted on said shaft, an outer cylindrical body of transparent material mounted on the shaft for rotation thereon, fins on the outer surface of the body to cause its rotation when the lure is pulled through water, the body being adapted to slide longitudinally upon said shaft, the rear end of the body having an off-center peak, a washer fixedly and axially mounted on the shaft at an angle with respect to the longitudinal axis thereof for engagement with the peak, both the outer body and the float being circumscribed with a plurality of closely spaced stripes, means at the front end of the shaft for the attachment of a fish line thereto, means at the rear end of the shaft for the attachment of fish hooks thereto and a spinner axially affixed to the shaft to minimize rotation of the float in the direction opposite to that of the rotation of the outer body.

4. A fish lure including two hollow cylindrical bodies of transparent material, one body being within the other and both being mounted, one fixedly, and one rotatably on a shaft axially passing through both of said bodies, fins on the outer body to cause rotation thereof when the lure is pulled through water, spinner means to minimize rotation of the inner body in the opposite direction, cam means fixedly mounted on the shaft in cooperative engagement with a cam surface at one end of the outer body to cause longitudinal shifting of said outer body in the course of each rotation thereof about the shaft, both the outer and the inner bodies being circumscribed with a plurality of closely spaced stripes, the stripes on each body being spaced equally from each other by substantially the width of said stripes, the number of stripes on one body, per unit of length, being different than the number of stripes on the other body per the same unit of length, means on the shaft for attaching the same to a fish line, and means for the attachment of fish hooks on the shaft.

5. A fish lure comprising a shaft, a cylindrical float of transparent material fixedly mounted on said shaft, an outer cylindrical body of transparent material mounted on the shaft for rotation with respect thereto, fins on the outer surface of the outer body to cause its rotation when the lure is pulled through water, the outer body being adapted to slide longitudinally upon said shaft, the rear end of the outer body having an off-center peak, a washer fixedly and axially mounted on the shaft at an angle with respect to the longitudinal axis thereof for engagement with the peak, both the outer body and the float being circumscribed with a plurality of closely spaced stripes, the stripes on the float and on the outer body being evenly spaced from each other, the distance between any two stripes being substantially equal to the width of a single stripe, the number of stripes on the outer body, per unit of length, differing from the number of stripes per the same unit of length on the float, means at the front end of the shaft for attachment to a fish line, means at the rear end of the shaft for the attaching of fish hooks thereto and a spinner axially affixed to the shaft to minimize rotation of the float in the direction opposite to that of the rotation of the outer body.

6. A fish lure including an inner transparent body and an outer body enclosing the inner body, both bodies being mounted, one fixedly, on a shaft passing axially through both to enable relative rotation of said bodies on said shaft when the lure is pulled through the water, each body being of a generally cylindrical contour throughout a major portion of its length and having its cylinder axis coaxial with said shaft, both said inner transparent body and said outer body having means associated therewith representing to the eye stripes completely surrounding the axis of the bodies and spaces between said stripes corresponding substantially with the thickness of the stripes, the number of stripes on one body per unit of body length being different than the number of stripes on the other body per the same unit of length, and means to effect relative rotation of said bodies on said common axis whereby the individual stripes of one of said bodies may be caused to move past the indiivdual stripes of the other to create an interference pattern appearing to flow generally axially of the respective bodies.

7. A fish lure according to claim 6 in which the stripes on each said body form a helix.

8. A fish lure according to claim 6 in which each said body comprises a helical coil mounted for relative rotation on said common axis.

9. A fish lure according to claim 6 in which said inner body comprises a helical coil fixed to said shaft and a water-tight shell of transparent material enclosing said coil, and in which said outer body is a helical coil enclosing said shell.

JAMES F. FITZGERALD.

REFERENCES CITED

The following references are of record in the file of this patent:

UNITED STATES PATENTS

| Number | Name | Date |
| --- | --- | --- |
| 1,988,249 | Nygaard | June 15, 1935 |
| 2,078,816 | Shenitz | Apr. 27, 1937 |